United States Patent [19]

Jemison

[11] 3,819,139
[45] June 25, 1974

[54] CABLE HANGER
[75] Inventor: William Jemison, Summit, N.J.
[73] Assignee: Heyman Manufacturing Company, Kenilworth, N.J.
[22] Filed: May 17, 1972
[21] Appl. No.: 253,996

[52] U.S. Cl.............. 248/73, 24/16 PB, 24/73 PB, 248/71, 248/74 PB
[51] Int. Cl............................................. F16l 3/12
[58] Field of Search.................. 248/74 PB, 71, 73; 24/73 PB, 16 PB

[56] References Cited
UNITED STATES PATENTS
| | | | |
|---|---|---|---|
| 2,969,216 | 1/1961 | Hallsey | 248/74 PB X |
| 3,144,695 | 8/1964 | Budwig | 248/74 PB X |
| 3,463,427 | 8/1969 | Fisher | 248/74 PB X |
| 3,550,219 | 12/1970 | Van Buren | 248/73 PB X |
| 3,590,442 | 7/1971 | Geisinger | 24/16 PB |
| 3,605,199 | 9/1971 | Eberhardt | 24/16 PB |

FOREIGN PATENTS OR APPLICATIONS
1,005,269  9/1965  Great Britain.................... 24/16 PB Primary Examiner—Marion Parsons, Jr.
Assistant Examiner—Rodney H. Bonck
Attorney, Agent, or Firm—Auslander & Thomas

[57] ABSTRACT

A cable hanger including a strap closure through the strap and head may be optionally closed over a bundle of cable, either before or after being snapped into an aperture. The head of the hanger includes grasping means to self lock in the aperture.

9 Claims, 13 Drawing Figures

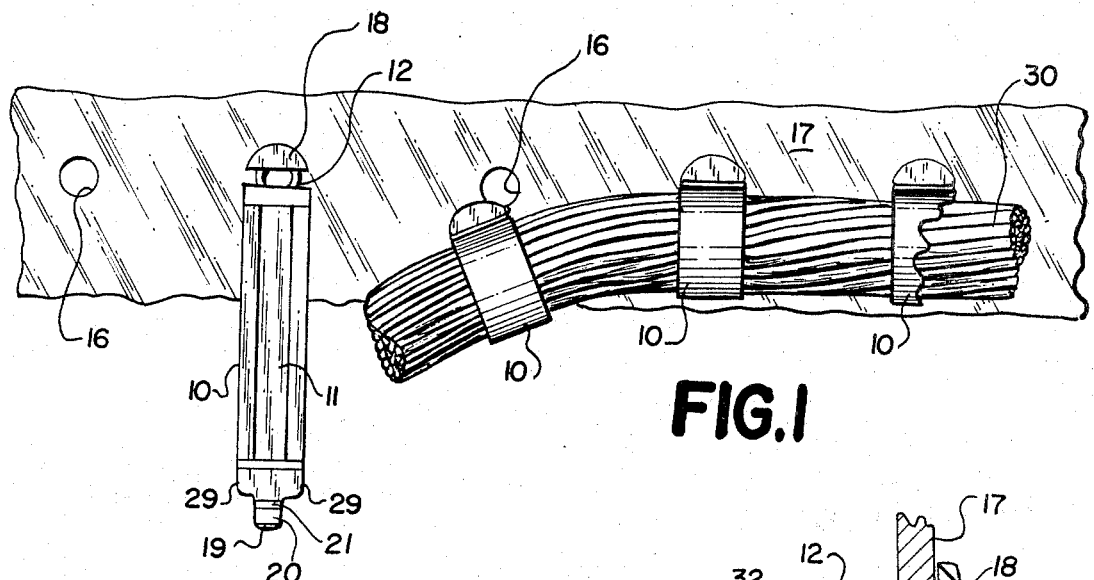
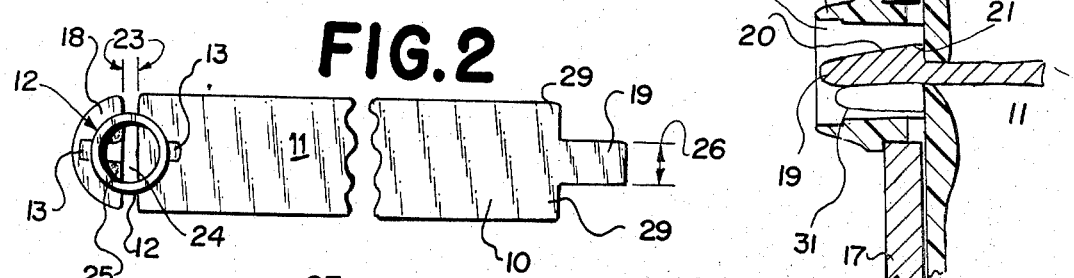
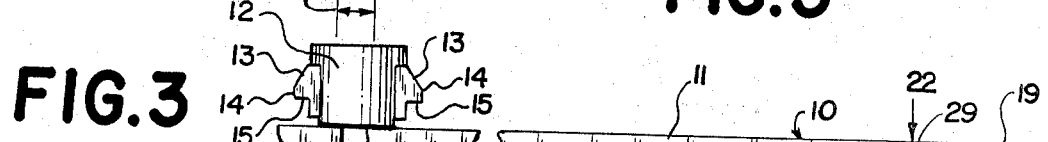
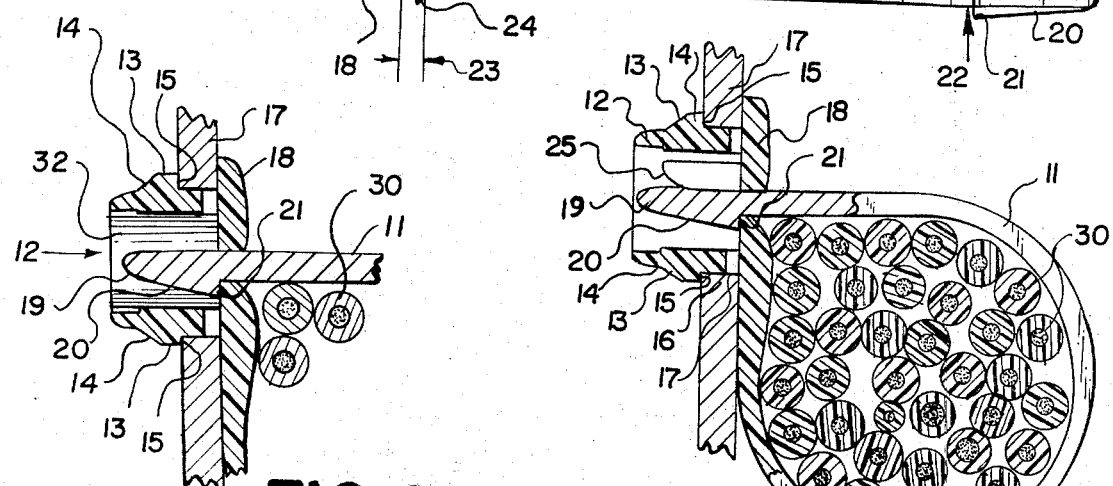

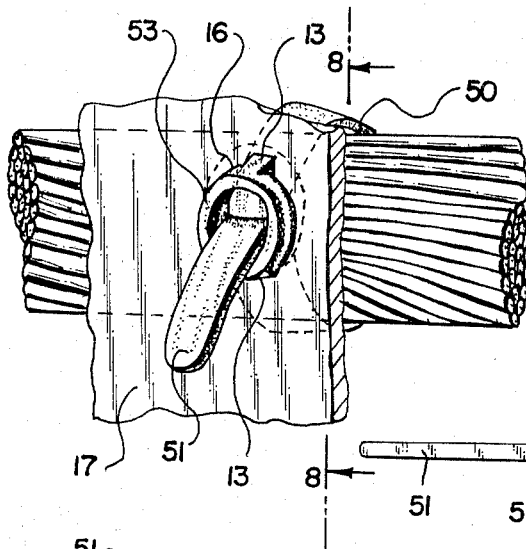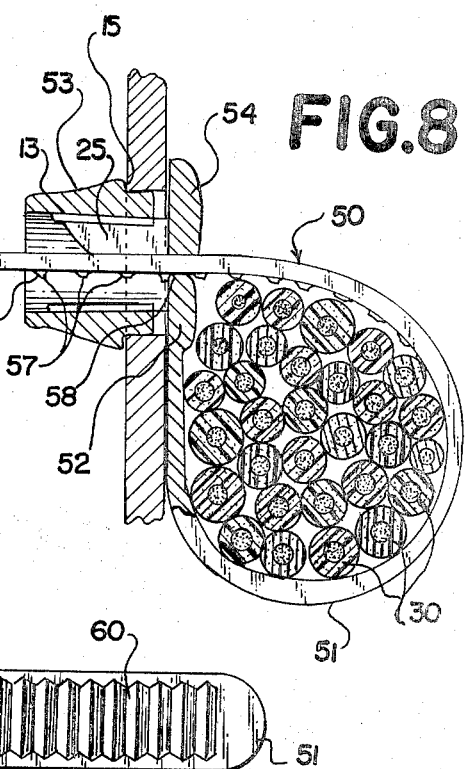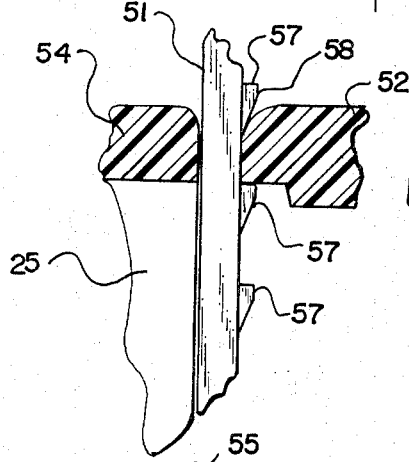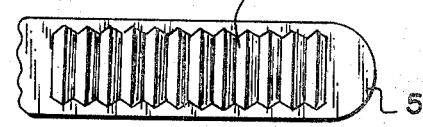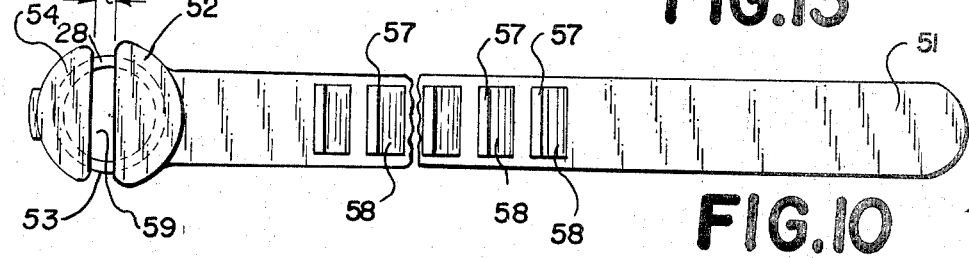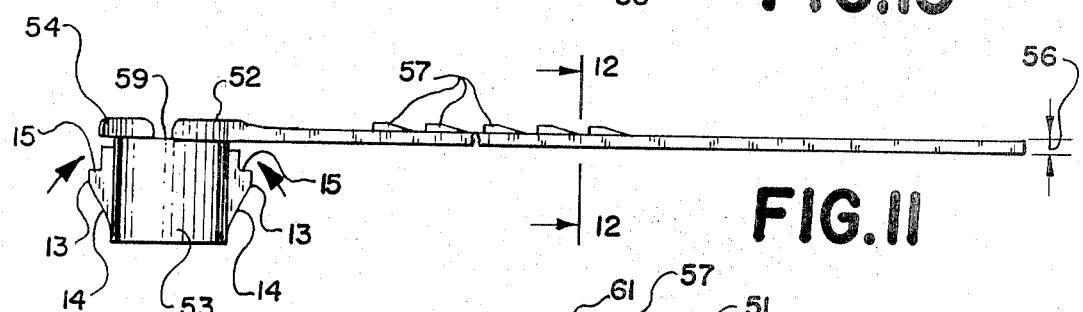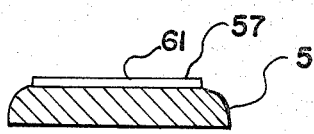

CABLE HANGER

The present invention relates to an improved cable hanger having the integral function of being self locking in an aperture, either before or after cables, rods, tubes or the like are engaged in the strap which is also self locking upon proper insertion in the locking aperture.

Cable hangers of the past have been awkward to hang since they usually had to be nailed into position or oftentimes could not be placed in an aperture after the cable has been engaged in the hanger.

Now where the present invention is employed, great time and labor saving may be achieved by having an area for the lining of cable pre-punched or drilled so that cables and the like may be quickly bound and snap inserted in an aperture from the working side of the wall without need to work both sides of a wall which may have one side for all intents and purposes, inaccesible.

The simplest cable hangers are looped metal or other substance placed around a bundle with the extending ends of the hanger nailed to a surface, holding the loop together and in place.

Other devices require screws or nails to fix them in place in order to perform their function and some cable hangers may require access to both sides of a wall through an aperture and are held or include means to engage the cable hanger in an aperture.

All of these means of the past have had their usefulness and advantage. As a practical matter, to save labor and expense generally, it is advantageous to be able to apply cable hangers, and this of course, includes tubes and rods, into apertures where they are each self held and may optionally be pre closed over the bundle even before being attached at the aperture. It is important also to minimize structure to reduce cost and simplify the mechanism for holding the bundle and mounting in the aperture.

The aperture itself may provide further economy with the present invention since they may easily be prepunched, many at a stroke and be set to await the construction phase of wiring cable without further preparation.

The passing of the strap end through the elongated head further provides greater stability to the locked strap, against loosening or being twisted loose. Support that may be used inside the head is a further improvement over the flimsy grasps that may be found in the art of bundle ties.

According to the present invention a cable or bundle hanger is provided self lockable in an aperture and optionally pre-engageable over cable of simple construction, preferably molded of strong dielectric plastic having some yieldability with the strap end passing into the head.

Although such novel feature or features believed to be characteristic of the invention are pointed out in the claims, the invention and the manner in which it may be carried out may be further understood by reference to the description following and the accompanying drawings.

FIG. 1 is a front elevation of cable and cable hangers of the present invention with mounting apertures.

FIG. 2 is a top plan view of an embodiment of the present invention.

FIG. 3 is a side elevation of FIG. 2.

FIG. 4 is a section of the cable hanger of FIGS. 1 - 3 holding cable mounted in an aperture.

FIG. 5 is a variant of the cable hanger of FIG. 4.

FIG. 6 is another variant of the cable hanger of FIG. 4.

FIG. 7 is a cut away view of another cable hanger of the present invention as seen from the outside aperture wall.

FIG. 8 is a section of FIG. 7 at lines 8 — 8.

FIG. 9 is a detail of the opening and strap of the cable hanger of FIG. 7.

FIG. 10 is a bottom plan view of the cable hanger of FIG. 7.

FIG. 11 is a side elevation of FIG. 10.

FIG. 12 is a section of FIG. 11 at lines 12 — 12.

FIG. 13 is a variant end of the strap portion of the cable hanger of FIG. 7.

Referring now to the figures in greater detail, where like reference numbers denote like parts in the various figures.

The cable hanger 10 as shown in FIG. 4, comprises a strap 11 with a head 12. The head 12 includes grasping means, as illustrated herein, fingers 13, having ramp 14 and shoulders 15. The head 12 is of a size to fit into an aperture 16. The fingers 13 yield as the ramps 14 guide the head 12 into the aperture, then once past the ramps 14, the fingers 13 spring outward, grasping the wall 17 and holding it between the shoulders 15, the strap 11 and the head of the strap 18.

The fingers 13 must be resilient in order to slide and grasp, but the grasping means are only illustrative of one form of the well known art of having self locking bushings and the like.

The head 12 is preferably molded integral to the strap 11 and the head of the strap 18. The strap end 19, as shown in FIGS. 1, 3, 4 and 6 has a ramp 20 ending at a shoulder 21. The thickness 22, as shown in FIG. 3, of the strap 11, extends past the shoulder 21. Where the strap 11 is grasped the strap 11 is about equal to the width 23 of the gap 24 as shown in FIG. 3 between the strap portions 11 and the strap head end portion 18.

It is preferable to have supports 25 extending axially through the head, contiguous with the edge of the strap end 19 as shown in the embodiments of FIGS. 4 and 5. Thus a strap end 19, engaged in the head 12, through the gap 24 has its shoulder 21 engaged against the end 18 of the strap 11 substantially immobile, vertically held by the supports 25.

The width 26 of the strap end 19 is substantially the inner width 27 of the head 12, thus there is practically no latitude for play once the strap 19 is engaged in head 12. The top 28 of the head 12 and end shoulders 29 of the strap 11 abut each other when the strap end 19 is engaged in the head 12, further limiting torsions and play likely to disengage the strap end 19.

As can be seen in FIG. 4, the strap 11 may be folded over a bundle of cables 30 with the strap end 19 locked into the head 12 with the ramp 20 facing inward of the strap 11 and cable 30.

In FIG. 5, the ramp 20 is facing outward of the cable bundle 30 and supports 31 are beneath the strap end 19 away from the ramp 20.

While not a preferred embodiment, FIG. 6 shows the strap end 19 and ramp 20 locked in the head 12 without support other than from the wall 32 of the head 12.

In use, the cable hanger 10 of the present invention may be used to place and support a cable bundle 30. In FIG. 1, a wall 17 with aperture 16 is shown with mounted cable hangers 10. Optionally, the cable hanger 10 of the present invention may be engaged around the cable bundle 30 and then pushed into the aperture 16, as shown in FIG. 1. Or as shown in FIG. 1, the cable hanger 10 may be engaged in the aperture, then later wrapped about a cable bundle 30 and have the strap end engaged in the gap 24.

The cable hanger 10 and head 12 must have some resilience so that the strap head 18 and the other edge of strap 11 forming the gap 23 can yield to the greater thickness of the end of the ramp 20 and snap back to grasp the strap end 19.

Where pre-punched apertures 16 are spaced for supporting cable, rapid and effective handling of placing the cable is inexpensively enabled. The steps of mounting the cable hanger 10 and engaging the cable 30 are independent of each other, all within the cable hanger 10 of the present invention. There is no necessary order in which they need be performed, nor prepreparation for performance and a functioning may take place from only one side of a wall 17.

The cable hanger 50, as shown in FIGS. 7 – 12, functions substantially as the cable hanger 10. The strap 51 is provided with a flared end portion 52, wide enough to partially accommodate a wider head 53. The head of the strap 54 must also support the head 53 and be spaced away from the end portion 52 of the strap 51 a distance 55 about equal to the thickness 56 of the strap 51.

The strap 51 is provided with a series of ratches 57, which are sloped so that they act as ramps 58 to guide the ratches 57 through the narrow gap 59 between the flared end portion 52 of the strap 51 and the head 54 of the strap 51.

But for differences in size, as required under the circumstances, the fingers 13, ramp 14, shoulders 15 and supports 25, 31 perform their usual functions.

Because of the ratchets 57, the cable hanger 50 is adjustable to optional size cables 30, or bundles, as can be seen in FIG. 8.

In FIG. 13, an optional serration 60 is shown in the end of the strap 51, useable as a finger grip for grasping the strap 51 for tightening over a cable bundle 30.

While the cable hanger 50 may have its head 53 first set in an aperture 16 and then have the strap 51 pushed through, it is easiest to tighten the strap over the cable 30 and then insert the head in the aperture 16. In some instances, where the other side of the wall 17 is accessible, it may be possible to tighten the strap 51 after it is inserted as it protrudes through the wall 17, as may be seen in FIG. 7.

The resilience of the head 53 and flared strap end 52 and head 54 of the strap 51 flex to allow the ramps 58 to ride through the gap 59 and flex back to hold the strap 51 abutted against the flat 61 of the ratchet as can be seen in FIGS. 9 and 12.

The grasp of the strap 51 will appear to be firmer than the prior art cable ties which usually have flexible tongues or ratchet tooth to ratchet tooth grasps.

The terms and expressions which are employed are used as terms of description; it is recognized, though, that various modifications are possible.

Having thus described certain forms of the invention in some detail, what is claimed is:

1. A cable hanger to grasp cable before or after being hung comprising a strap, a gap at one end of said strap, a head portion integral with said strap, said head portion being hollow and surrounding said gap in said strap, said head portion including means to lock itself in an aperture in a wall, said lock means including fingers extending from said head, said fingers having ramp means, and said strap having on its other end a portion engageable in said gap and extending into said head, said engageable portion being wide enough to have little play in said head when engaged in said gap, said engageable portion of said strap including grasp means, said grasp means including ramp means, said end of the strap having the gap therein being flexible to allow said ramp means to pass through said strap gap and hold said strap in said head and said gap whether or not said head is engaged in an aperture.

2. The invention of claim 1 wherein said strap is wider than said head and wherein said gap is narrower than said strap.

3. The invention of claim 2 wherein said strap grasp portions are approximately as wide as the inside of said head.

4. The invention of claim 3 wherein said strap grasp portion includes at least one ratchet.

5. The invention of claim 1 wherein said ratchet is along the strap on the side of said strap opposite said side said head extends from.

6. The invention of claim 5 wherein said head portion includes inner support means adapted to support said strap end extending into said head on the side opposite said at least one ratchet.

7. The invention of claim 1 wherein said strap includes a plurality of ratchets along its length.

8. The invention of claim 7 including finger gripping means along said strap.

9. The invention of claim 3 including ratchets on said strap wherein said head includes inner support means adapted to support said strap in said gap on the side opposite said ratchets on said strap.

* * * * *